(12) United States Patent
Lin

(10) Patent No.: US 8,049,975 B2
(45) Date of Patent: Nov. 1, 2011

(54) APPARATUS AND METHOD FOR ASSEMBLING LENS MODULE

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 322 days.

(21) Appl. No.: 12/327,599

(22) Filed: Dec. 3, 2008

(65) Prior Publication Data
US 2009/0262632 A1    Oct. 22, 2009

(30) Foreign Application Priority Data
Apr. 17, 2008    (CN) .......................... 2008 1 0301170

(51) Int. Cl.
*G02B 7/02* (2006.01)

(52) U.S. Cl. .................. 359/811; 359/819; 359/822

(58) Field of Classification Search .............. 359/811, 359/819, 813, 818, 822–824, 827; 369/44.15, 369/44.22; 348/E5.028
See application file for complete search history.

(56) References Cited

U.S. PATENT DOCUMENTS
5,249,082 A * 9/1993 Newman ...................... 359/813
* cited by examiner

*Primary Examiner* — Ricky Mack
*Assistant Examiner* — Mahidere Sahle
(74) *Attorney, Agent, or Firm* — Altis Law Group, Inc.

(57) ABSTRACT

An apparatus for assembling a lens module, is provided. The lens module includes a lens and a lens holder for receiving the lens. The lens holder has a through hole and a retainer formed in the through hole. The apparatus includes a base for supporting the lens holder, and a supporter formed on the base, for extending through the through hole of the lens holder and supporting the lens thereon. A height of the supporter is greater than a depth of the through hole of the lens holder. The supporter is movable relative to and away from the lens holder so as to place the lens on the retainer in the through hole of the base.

12 Claims, 6 Drawing Sheets

APPARATUS AND METHOD FOR ASSEMBLING LENS MODULE

BACKGROUND

1. Technical Field

The present invention relates to apparatuses and methods for assembling lens modules, and particularly to an apparatus and a method for placing a lens into a lens holder.

2. Description of Related Art

In lens modules, lenses and lens holders are key components. With the lens modules progressively becoming more miniaturized over time, lenses and lens holders are correspondingly becoming smaller and smaller.

Referring to FIGS. 5 and 6, a typical lens holder 1 and a typical lens 9 are shown. The lens 9 has a central optical portion 90 and a peripheral portion 91 surrounding the central optical portion 90. The lens holder 1 has a through hole 10 defined therein, and a retainer 11 formed in an inner wall 1C of the through hole 10. The retainer 11 is composed of a plurality of spaced elongated curved flakes arranged along an imaginary circle, each of which is usually in microns of thickness. The lens 9 is placed on the flakes of the retainer 11 with the peripheral portion 91 retained by and usually adhered to the flakes of the retainer 11. When a driving force, such as a static force is applied on the flakes, the flakes together with the lens 9 are capable of moving upwards or downwards, such that an autofocus or zoom function will be realized.

However, as the flakes of the retainer 11 are too thin, they are easy to be slanted or brittle, thus, to assemble the lens 9 on the flakes is difficult.

What are needed, therefore, are an apparatus and a method for assembling a lens module, which can overcome the above shortcomings.

SUMMARY

An apparatus for assembling a lens module, is provided. The lens module includes a lens and a lens holder for receiving the lens. The lens holder has a through hole and a retainer formed in the through hole. The apparatus includes a base for supporting the lens holder, and a supporter formed on the base, for extending through the through hole of the lens holder and supporting the lens thereon. A height of the supporter is greater than a depth of the through hole of the lens holder. The supporter is movable relative to and away from the lens holder so as to place the lens on the retainer in the through hole of the base.

Other advantages and novel features of the present apparatus and method will become more apparent from the following detailed description of embodiment when taken in conjunction with the accompanying drawings.

BRIEF DESCRIPTION OF THE DRAWINGS

Many aspects of present apparatus and method can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

DETAILED DESCRIPTION OF THE EMBODIMENTS

Embodiments of the present apparatus and method will now be described in detail below and with reference to the drawings.

Figure 1:
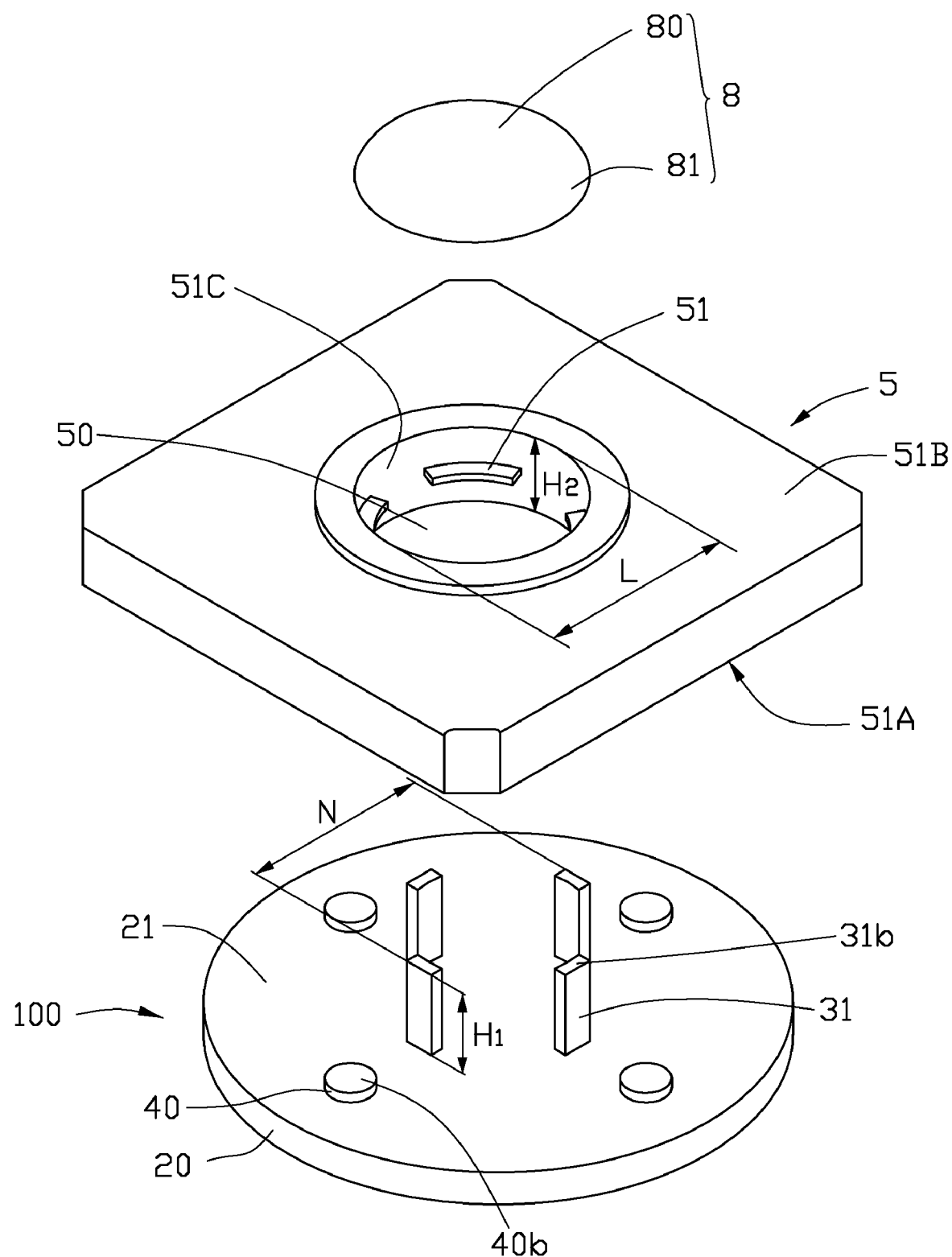
FIG. 1 is a schematic view of an apparatus for assembling a lens module in accordance with a first embodiment, the lens module including a lens and a lens holder for receiving the lens.
Figure 2:
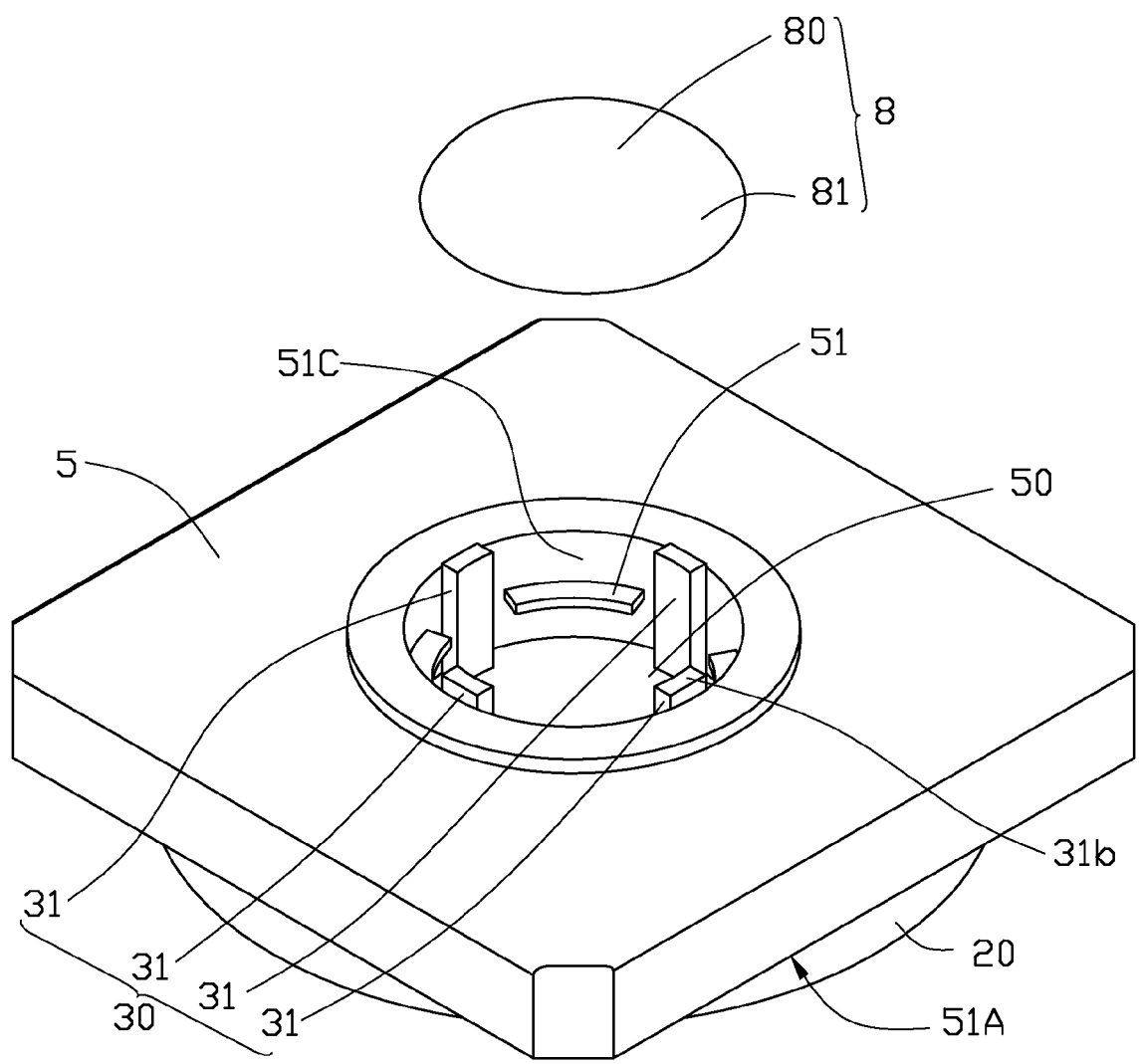
FIG. 2 is an assembled view of the lens holder and the apparatus of FIG. 1.

Referring to FIGS. 1 and 2, an apparatus 100 for assembling a lens 8 into a lens holder 5 in accordance with a first embodiment, is provided. The apparatus 100 includes a base 20 and a supporter 30 formed on the base 20. The lens 8 includes a central optical portion 80 and a peripheral portion 81 surrounding the central optical portion 80. The lens holder 5 has a first surface 51A and a second surface 51B at opposite sides thereof. Preferably, the first and second surfaces 51A, 51B are flat surfaces. A through hole 50 is defined in a center of the lens holder 5 between the first surface 51A and the second surface 51B. A retainer 51 is formed in an inner wall 51C of the through hole 50. In present embodiment, the retainer 51 includes four spaced elongated curved flakes arranged along an imaginary circle, with two of the flakes opposite to each other. Each of the flakes is in microns of thickness. Alternatively, the retainer 51 may be a ring-shaped flake.

The base 20 includes a flat surface 21 and a plurality of spaced pads 40 formed on the flat surface 21. In present embodiment, the supporter 30 includes four spaced posts 31. A height $H_1$ of each of the posts 31 is greater than a depth $H_2$ of the through hole 50. A largest distance N between two of the posts 31 is smaller than or equivalent to a diameter L of the through hole 50. One of the posts 31 may be received between two adjacent flakes of the retainer 51 (see FIG. 2). An end surface 31b of each of the posts 31 is flat. An end surface 40b of each of the pads 40 is flat.

A method for assembling the lens 8 into the lens holder 5 using the apparatus 100, including steps of:

placing the lens holder 8 on the pads 40 of the base 20 with the supporter 30 passing through the through hole 50;

placing the lens 8 on the supporter 30; and moving the apparatus 100 relative to and away from the lens holder 5 to place the lens 8 on the retainer 51 in the through hole 50 of the lens holder 5.

The pads 40 elevate the lens holder 5 a distance from the flat surface 21 of the base 20, thereby facilitating the base 20 to be separated from the lens holder 5 in a later step. Due to the support of the supporter 30, the lens 8 can be displaced steadily on the retainer 51 without damage to the flakes of the retainer 51. A surface of the flakes of the retainer 51 may be applied thereon a glue beforehand, such that when the lens 8 is placed on the retainer 51, the peripheral portion 81 of the lens 8 will be adhered to the flakes at the same time.

Figure 3:
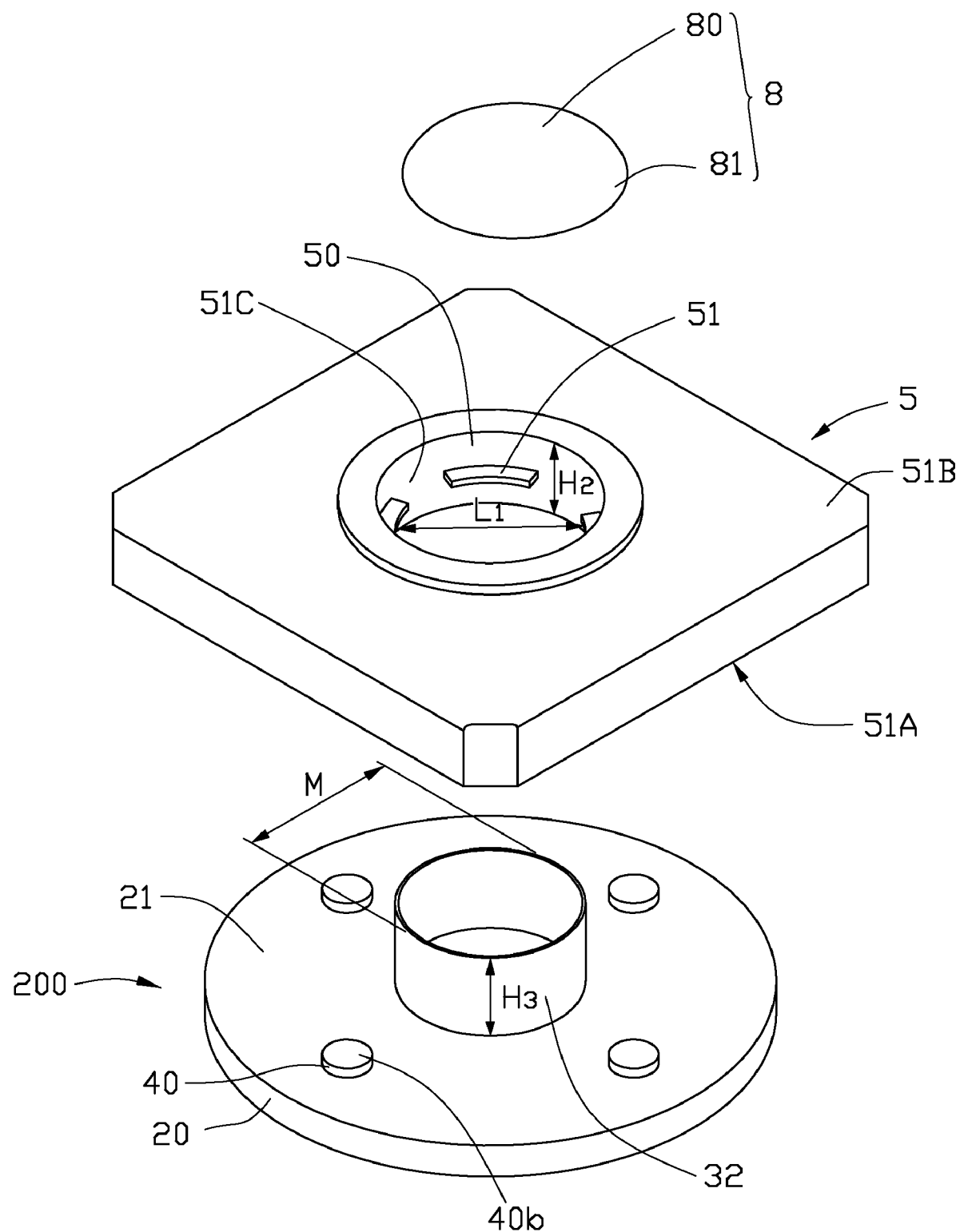
FIG. 3 is a schematic view of an apparatus for assembling a lens module in accordance with a second embodiment, the lens module including a lens and a lens holder for receiving the lens.
Figure 4:
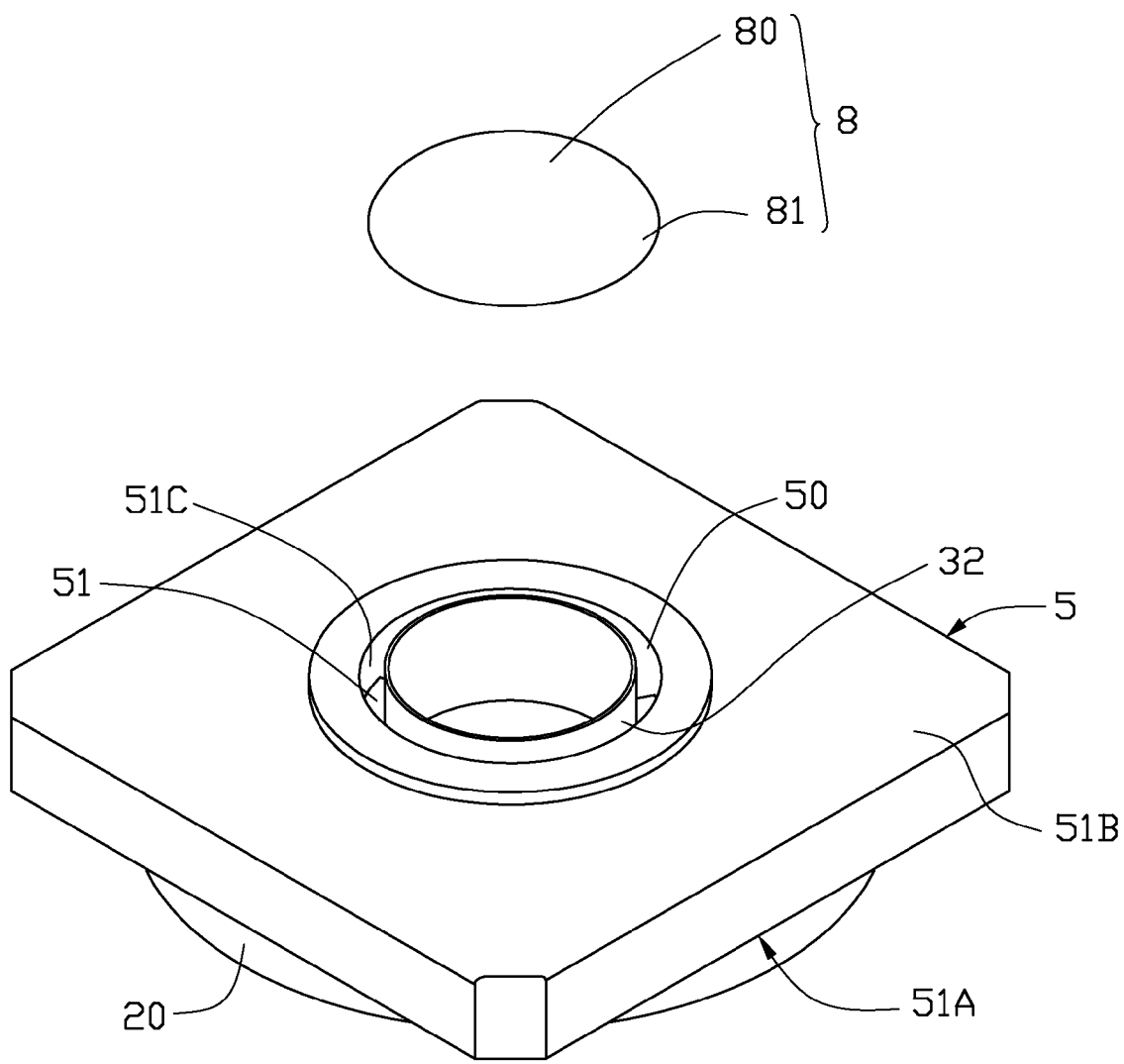
FIG. 4 is an assembled view of the lens holder and the apparatus of FIG. 3.
Figure 5:
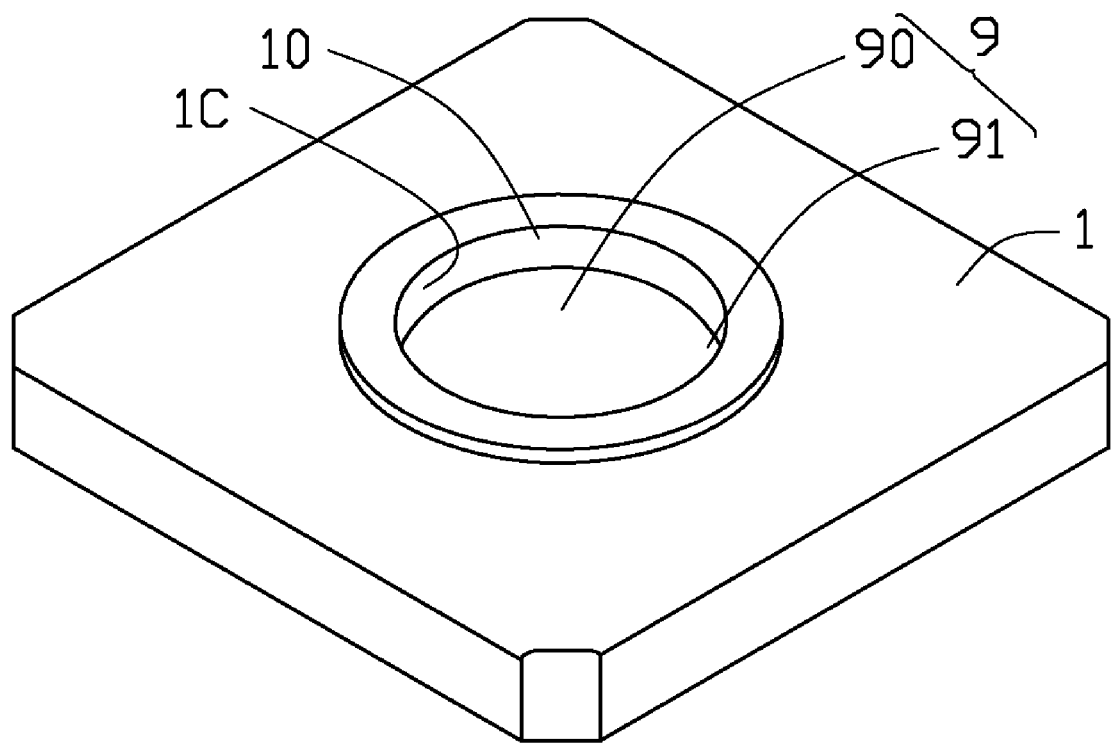
FIG. 5 is an assembled view of a typical lens holder and a typical lens.
Figure 6:
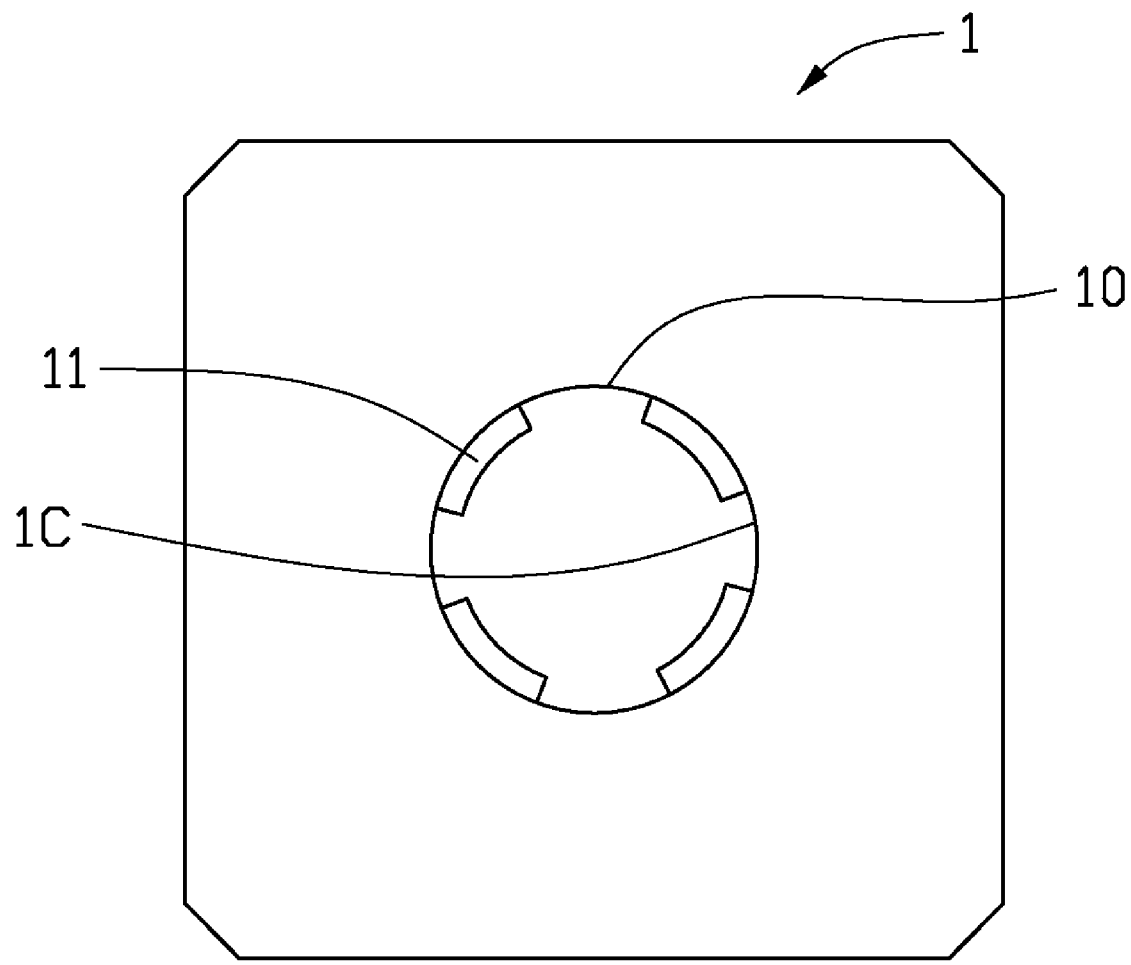
FIG. 6 is a plan view of the lens holder of FIG. 5.

Referring to FIGS. 3 and 4, an apparatus 200 for assembling the lens 8 into the lens holder 5 in accordance with a second embodiment, is provided. The apparatus 200 is similar to the apparatus 100 illustrated above, however, the apparatus 200 includes a supporter 32, which is in a hollow cylinder shape. A height $H_3$ of the supporter 32 is greater than the depth $H_2$ of the through hole 50. An outer diameter M is smaller than a diameter $L_1$ defined by the opposite two flakes of the retainer 51, such that the supporter 32 is movable in the through hole 50.

A method for assembling lens 8 into the lens holder 5 using the apparatus 200 is the same as that of the apparatus 100.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An apparatus for assembling a lens module, the lens module comprising a lens and a lens holder for receiving the lens, the lens holder having a through hole and a retainer formed in the through hole, the apparatus comprising:
    a base for supporting the lens holder; and
    a supporter formed on the base, for extending through the through hole of the lens holder and supporting the lens thereon, a height of the supporter relative to the base being greater than a depth of the through hole of the lens holder, the supporter being movable relative to and away from the lens holder so as to place the lens on the retainer in the through hole of the lens holder.

2. The apparatus as described in claim 1, wherein the base comprises a surface and a plurality of spaced pads formed thereon, the pads configured for supporting the lens holder thereon.

3. The apparatus as described in claim 1, wherein the retainer comprises a plurality of spaced elongated curved flakes arranged along an imaginary circle.

4. The apparatus as described in claim 1, wherein the retainer is in microns of thickness.

5. The apparatus as described in claim 1, wherein the supporter comprises a plurality of spaced posts.

6. The apparatus as described in claim 1, wherein the supporter is a hollow cylinder.

7. A method for assembling a lens module, the lens module comprising a lens and a lens holder, the lens holder having a through hole and a retainer formed in the through hole, the method comprising:
    providing an apparatus comprising a base and a supporter formed on the base, a height of the supporter relative to the base being greater than a depth of the through hole of the lens holder;
    placing the lens holder on the base with the supporter passing through the through hole;
    placing the lens on the supporter; and
    moving the apparatus relative to and away from the lens holder to place the lens on the retainer in the through hole of the lens holder.

8. The method as described in claim 7, wherein the base comprises a surface and a plurality of spaced pads formed thereon for supporting the lens holder thereon.

9. The method as described in claim 7, wherein the retainer comprises a plurality of spaced elongated curved flakes arranged along an imaginary circle.

10. The method as described in claim 7, wherein the retainer is in microns of thickness.

11. The method as described in claim 7, wherein the supporter comprises a plurality of spaced posts.

12. The method as described in claim 7, wherein the supporter is a hollow cylinder.

* * * * *